(12) United States Patent
Becker et al.

(10) Patent No.: US 7,729,054 B2
(45) Date of Patent: *Jun. 1, 2010

(54) OPTICAL DIFFUSER FOR PRODUCING A CIRCULAR LIGHT FIELD

(75) Inventors: Ralf Becker, Bad Gandersheim (DE); Ruediger Kittelmann, Einbeck (DE); Eberhard Kurek, Kalefeld (DE); Harry Wagener, Alfeld (DE); Ulrich Zirfas, Bad Gandersheim (DE)

(73) Assignee: Schott AG, Mainz (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/233,851

(22) Filed: Sep. 19, 2008

(65) Prior Publication Data

US 2009/0015925 A1      Jan. 15, 2009

Related U.S. Application Data

(62) Division of application No. 10/943,120, filed on Sep. 16, 2004, now Pat. No. 7,443,588.

(30) Foreign Application Priority Data

Sep. 20, 2003   (DE) ................................ 103 43 630

(51) Int. Cl.
   *G02B 13/20*   (2006.01)
   *G02B 5/02*    (2006.01)
(52) U.S. Cl. .................... 359/599; 359/454; 362/297
(58) Field of Classification Search ................ 359/599, 359/707, 454–458, 896
   See application file for complete search history.

(56) References Cited

U.S. PATENT DOCUMENTS 4,946,252 A * 8/1990 Sugawara ................. 359/619
5,124,839 A * 6/1992 Yamazaki et al. ........... 359/454
5,247,390 A * 9/1993 Hed ........................... 359/599
6,079,854 A * 6/2000 Ra .............................. 362/342
6,086,227 A * 7/2000 O'Connell et al. .......... 362/297
6,778,148 B1 * 8/2004 Pack .......................... 343/895
7,443,588 B2 * 10/2008 Becker et al. ............... 359/599
2005/0185300 A1 * 8/2005 Kittelmann et al. ......... 359/742

FOREIGN PATENT DOCUMENTS

EP        0 961 136 A2    12/1999
EP          961 136    *  12/1999    ................ 359/599

* cited by examiner

Primary Examiner—Thong Nguyen
(74) Attorney, Agent, or Firm—Michael J. Striker

(57) ABSTRACT

The optical diffuser has a transparent base body with a base body surface, which is divided into facets. Each facet has an elevation or a depression correlated or associated with a second curved surface. Respective facets have correspondingly different geometrical shapes. In some embodiments the respective apexes (S) of the elevations or depressions are arranged along a spiral, especially an Archimedean spiral. In other embodiments the apexes (S) are defined by coordinates $(x_s', y_s')$ derived by rotation of coordinates $(x_p, y_p)$ of all points (P), which are defined by an arrangement of facets with regular hexagonal edge contours, about a center (0, 0) through a twist angle ($\delta$). Alternatively the apexes (S) are defined by coordinates $(x_s'', y_s'')$ derived from coordinates $(x_p, y_p)$ of all points (P), which are defined by the arrangement of facets with regular hexagonal edge contours, by random variations with the help of a Monte Carlo method. The optical diffuser according to the invention produces a circular soft-edged light field, which is outstanding for photographic applications.

5 Claims, 14 Drawing Sheets

OPTICAL DIFFUSER FOR PRODUCING A CIRCULAR LIGHT FIELD

CROSS-REFERENCE

This application is a divisional of prior U.S. patent application Ser. No. 10/943,120, filed on Sep. 16, 2004, now U.S. Pat. No. 7,443,588. The aforesaid prior U.S. Patent Application provides the basis for a claim of priority of invention for the invention claimed herein below under 35 U.S.C. 120.

BACKGROUND OF THE INVENTION

1. Field of the Invention

The present invention relates to an optical diffuser, which has a transparent base body with a first surface, which is divided into facets and in which each facet has an elevation or a depression correlated or associated with a second curved surface.

2. Description of the Related Art

The optical diffuser can be used as a lens for a headlight. Also the optical diffuser can be used in an open-face spotlight for film, television, for stage or for architectural lighting and for photographic purposes.

EP 0 961 136 A2 discloses an optical diffuser with a diffusing body, whose surface is divided into facets. Each facet has an elevation with a spherical surface, which acts as a lens. The facets have a regular hexagonal edge contour, so that the arrangement of EP 0 961 136 A2 can be characterized as a honey-comb.

In practical applications this optical diffuser is characterized by its hexagonal light field, which is distinctly sharp-edged. The term "sharp-edged light field" means that there is a distinct gradient in the light intensities in the light field plane at the edges of the light field. The light intensities have a central region with a plateau-like behavior, which follows the strong drop or large gradient at the edge of the light field directed in an inward direction.

Also when a discharge lamp is used, coloration can occur at the edge regions of the light field, which can have different shades and tones according to the type of discharge lamp used.

SUMMARY OF THE INVENTION

It is an object of the present invention to provide an optical diffuser, which produces a uniform circular light field It is another object of the present invention to provide an optical diffuser, which produces a light field with illumination intensities having a predetermined gradient at the edges, so that light field has either soft or hard edges according to choice.

These objects and others, which will be made more apparent hereinafter, are attained in an optical diffuser comprising a transparent base body with a base body surface divided into facets, and in which each facet has an elevation or a depression with an apex.

According to the present invention the respective facets have correspondingly different shapes.

The term "facet" in the sense of the present invention means a surface, which is bounded or generated by the edges of a certain geometric form. The facets, which are bounded by the geometric forms, can be planar or curved according to the shape of the first surface, i.e. whether the surface of the base body of the optical diffuser is planar or curved.

The elevations or depressions associated with the facets are elements of the optical diffuser. The elevations or depressions occupy the facets and are at least substantially above or below the base or first surface. The elevations or depressions act on the incident light like lenses.

The invention provides a superposition of plural differently shaped light fields and thus the desired circular light field. Depending on the respective facet configuration and the structure of the elevations or depressions associated with the facets, the light field may be prepared with a preselected or predetermined illumination intensity gradient, or may be hard or soft according to choice.

A soft light field is one, which has a gentle or small light intensity gradient at the edge of the light field. Of course a hard light field is the opposite. It is one, which has a steep or large light intensity gradient at the edge of the light field.

Another advantage of the present invention is that the new facet configuration avoids the coloration at the edges of the light field that would otherwise occur when a discharge lamp is used as light source.

DESCRIPTION OF THE PREFERRED EMBODIMENTS

A variety of different features of preferred embodiments increase the differences between the individual light fields that are superimposed and thus augment the above-described advantages.

Thus the facets can have various polygonal shapes. The number of corners of the polygons is variable. The facets with polygonal shapes should cover the surface completely, since otherwise no scattering would occur locally at some places. This would counteract the desired uniform illumination.

Furthermore also an optical diffuser could be prepared, in which the facets have different surfaces or areas.

Three-cornered, four-cornered, five-cornered, six-cornered and/or seven-cornered polygons can be selected for facet shapes used in various embodiments. The neighboring corners of the polygons can be connected with straight or curved lines.

Different orientations of the facets result as a further consequence of their non-uniformity.

The choices and variations of the curvatures of the elevations or depressions are further features with which the circular light field and the soft or hard light field can be obtained. The curvature can be spherical; the depression or elevation can be spherical cup-shaped. Alternatively the curvature can be aspherical.

Also it is possible to vary the depth of the depressions or cavities and the height of the elevations in order to achieve the above-described aims in various embodiments.

Furthermore the foregoing features from the described embodiments can be combined with each other or used separately in alternative embodiments.

To implement the above-described invention in a first preferred embodiment an optical diffuser is provided, which has a transparent base body with a first surface divided into facets and in each facet an elevation or depression is associated with a second curved surface and the apexes S of the elevations or depressions are arranged along a spiral.

The "apex" S of an elevation or depression means the intersection point of the facet surface normal passing through the facet center of gravity with the curved surface of the elevation or depression.

Subsequently an example of how an optical diffuser of this type can be made is described in more detail.

The base material of the optical diffuser, preferably glass, is processed or worked in a molding process. The viscous hot base material is fed into a mold. The base material fills the hollow chamber in the mold and the geometry of the mold is formed like the negative of the desired shape. The molding or shaping process continues until the base material has cooled down and can be removed without deformation from the mold.

The molds necessary for manufacture of the optical diffusers, which are provided with elevations or depressions, are made by radial milling on a CNC-controlled machine tool.

When two depressions are introduced sufficiently close to each other in the mold, a fin-like or web-like edge remains between both depressions when a spherical cutter is used. If the neighboring depressions are equally deep and they have an equal radius, their common edge appears to be linear. When a depression has six adjacent neighboring depressions, this depression has edges, which comprise together six linear fin-like or web-like edges. Thus this depression appears to have a regular hexagonal shape. Thus in the general case the depressions appear to have a polygonal shape depending on the exact position and number of the neighboring depressions.

When two neighboring depressions differ in their radius and/or the depth of their milling, generally the common edge is curved. The edges for the depressions appear to take different geometric shapes.

In the usual case the facets should completely cover the surface of the optical diffuser. In these embodiments the surface of the mold has a full-surface covering arrangement of depressions each of which has a polygonal edge contour.

Understandably for aesthetic or technical reasons the optical diffuser can have a base body with a curved surface. In this case the mold is provided with an appropriately shaped curved surface. Thus the base body and correspondingly the mold can be spherical. In this embodiment the cutter or milling tool could be aligned with its rotation axis parallel to the radius vector of the spherical depression.

A plurality of irregularly arranged facets, which produce the desired circular light field, arises by arranging the apexes S of these facets along a spiral. With this arrangement no coloration is provided in the edge regions when a discharge lamp is used, but a predetermined light intensity gradient can be produced.

According to preferred embodiments of the invention coordinates of the respective apexes of the facets are derived from coordinates of corresponding points P, which form a regular arrangement of facets with regular hexagonal edge contours, according to a predetermined transformation of the corresponding points into the respective apexes.

The heights of or the depths of the depressions can be varied across the optical diffuser so that the elevations have different heights and the depressions have different depths. Also this helps to achieve the goal of preparing a circular and more or less soft or hard light field.

In most preferred embodiments the optical diffuser is in the form of a circular disk or a cylindrical body.

BRIEF DESCRIPTION OF THE DRAWING

The objects, features and advantages of the invention will now be illustrated in more detail with the aid of the following description of the preferred embodiments, with reference to the accompanying figures in which.

DETAILED DESCRIPTION OF THE INVENTION

Figure 1:
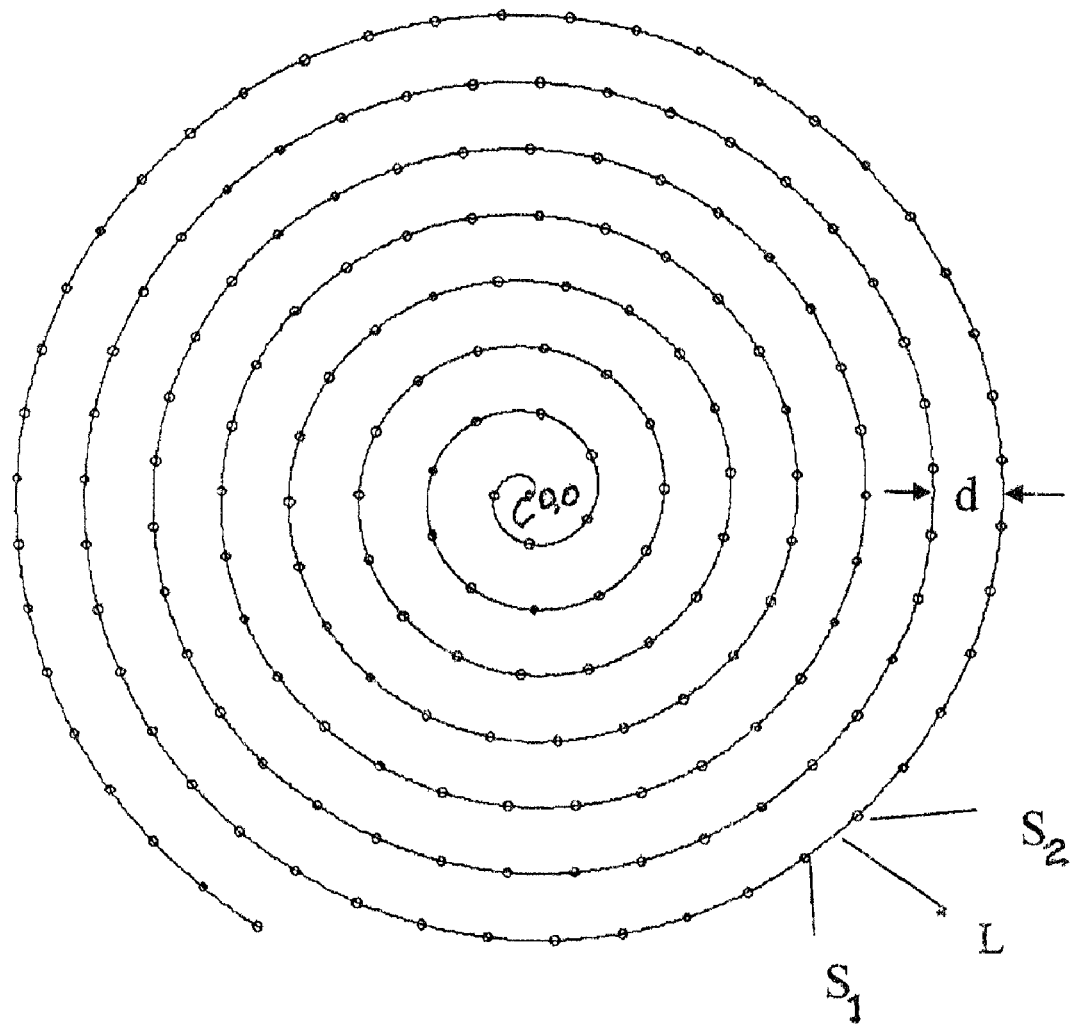
FIG. 1 is a diagrammatic view of a facet arrangement according to a first embodiment of the invention, showing the facet apexes S arranged in an Archimedean spiral.

In a preferred embodiment of the optical diffuser the apexes S are arranged on an Archimedean spiral, as shown in FIG. 1. This spiral is given by equation (1) in polar coordinates (r, $\phi$):

$$r = \{d/2\pi\} \cdot \phi (\phi = 0 \ldots 2\pi \ldots 4\pi) \qquad (1)$$

The center (0, 0) of the coordinate system is thus the starting point for the spiral found in the interior. The arc or curve length L between the two adjacent points $S_1$ and $S_2$ is then the distance along the spiral coil between these points and is given by the following equation (2):

$$L = \{d/4\pi\} \cdot [\{\phi_2(\phi_2^2+1)^{1/2} + Arsh\phi_2\} - \{\phi_1^2+1)^{1/2} + Arsh\phi_1\}] \qquad (2)$$

wherein $\phi_1$ and $\phi_2$ are the angular position coordinates of the adjacent points $S_1$ and $S_2$. The individual points $S_1$ and $S_2$ are obtained by continuously marking off points spaced a constant arc length L from each other along the spiral from inside to outside.

The apexes can be arranged equidistance from each other. However in other embodiments besides the equidistant arrangement of the apexes shown in FIG. 1, it is also possible to use a variable arc length L. An increasing arc length L from inside to outside can be selected. In this way one obtains smaller facets in the interior of the optical diffuser with elevations of smaller height or with depressions of lesser depth, and thus lesser light scattering action. The facets are larger at the edge of the optical diffuser, which results in greater height of the elevations or greater depth of the depressions, and thus greater light scattering action. The light field then has a rather small half scattering angle with substantially larger illumination intensities in the center of the light field. In contrast with constant L the light intensities would be rather plateau-like and soft.

The optical diffuser can be adjusted in many ways in respective lighting systems, for example to respective reflectors, by the above-described features, which can be employed either separately alone or combined with each other. Thus the optical diffuser can be adjusted to a given reflector by selecting the type of the spiral used, the value of the arc length L, but also by either varying the arc length L or keeping it constant. These features permit the influencing of the light field in predetermined regions to locally increase or decrease it and thus to optimize it in many ways.

Figure 4:
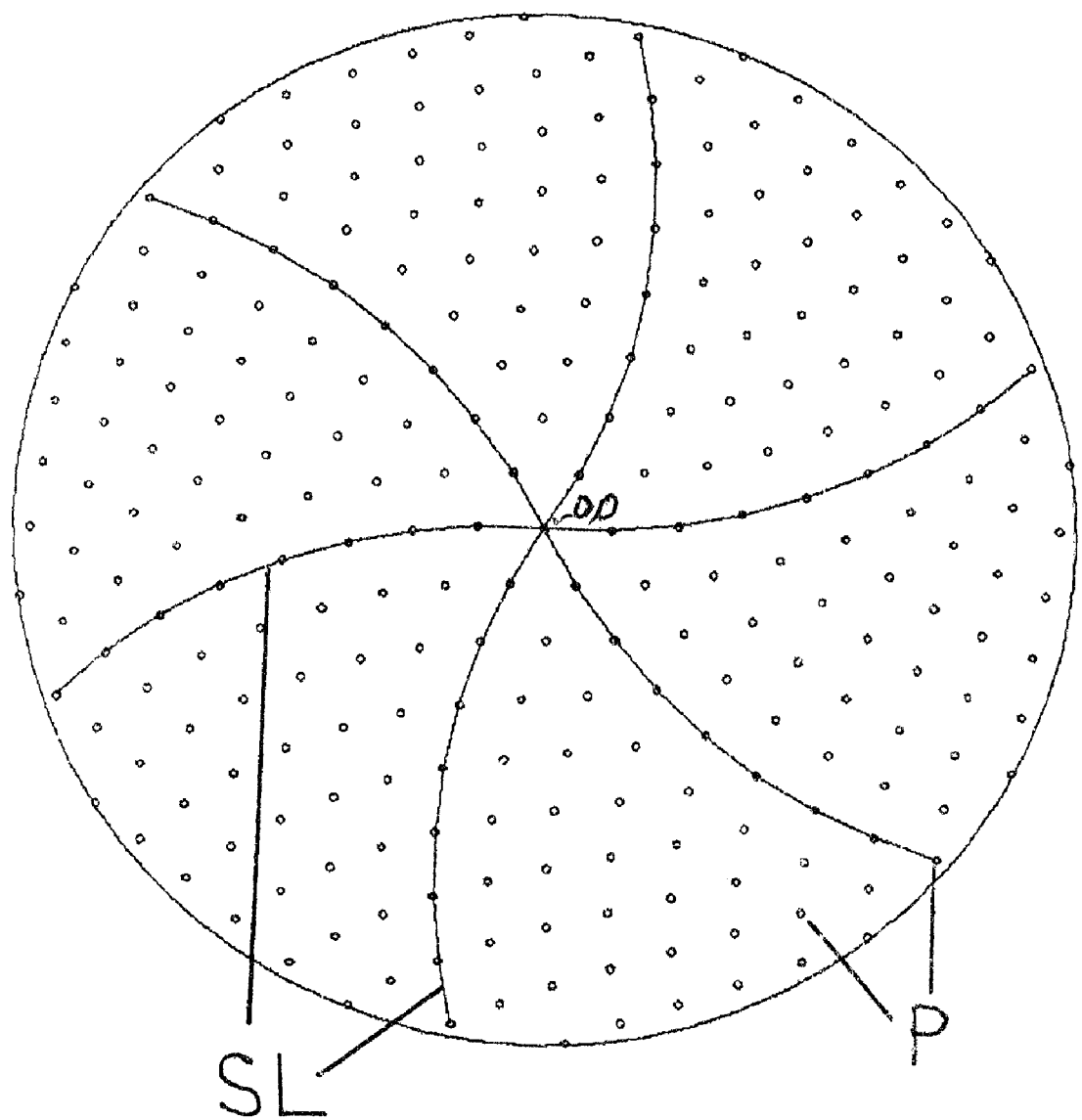
FIG. 4 is a diagrammatic view of a facet arrangement according to a second embodiment of the invention.

In a second embodiment of the invention, shown in FIG. 4, an optical diffuser is provided, which has a transparent base body with a first surface divided into a plurality of facets. In each facet an elevation or depression 4 is provided, which is associated with a second curved surface. The apexes of the elevations and/or depressions 4 are characterized by coordinates $(x_s, y_s)$ derived from coordinates $(x_p, y_p)$ of all points (P), which form an arrangement of facets with regular hexagonal edge contours, by rotation about an angle δ about a center (0, 0).

For illustration of this embodiment of the invention this sort of arrangement of facets with regular hexagonal edge contours is mathematically describable. This arrangement can be produced from three systems of lines equally spaced from each other, wherein each system is rotated 60° in relation to the neighboring system and their lines are described by the following system of equations (3a, 3b, 3c):

$$y = i \cdot \{\sqrt{3}/4\} \cdot D \tag{3a}$$

$$y = \tan 60° \cdot x + i \cdot \{\sqrt{3}/4\} \cdot \{D/\cos 120°\} \tag{3b}$$

$$y = \tan 120° \cdot x + i \cdot \{\sqrt{3}/4\} \cdot \{D/\cos 120°\} \tag{3c}$$

In these equations (3a, 3b, 3c) D is the facet diagonal. These three equations may be subsequently called or designated equation system 1. The first equation 3a is the equation for a set of horizontally oriented lines. The second equation 3b describes a set of lines with a positive slope equal to tan 60°. The third equation describes a set of lines with a negative slope of tan 120° C. The i is an index with values given by the following: $i=-i_A, -i_A+1, \ldots, -1, 0, +1, \ldots, i_E-1, i_E$. The values $i_A$ and $i_E$ are positive whole numbers.

Figure 2:
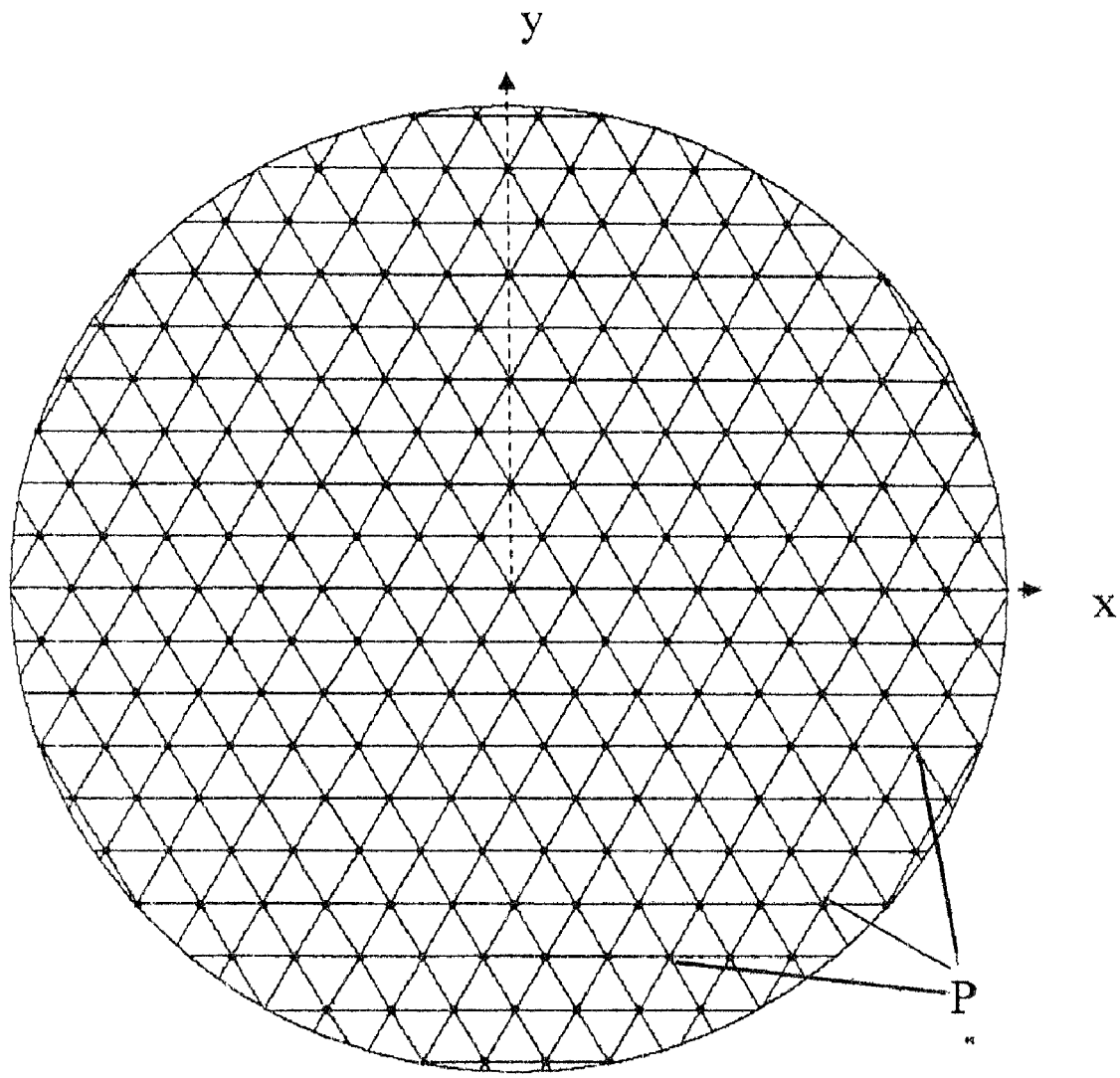
FIG. 2 is a diagrammatic view of another facet arrangement, showing three line systems with intersection points P used to produce this facet arrangement.

These three line systems form intersection points P, which are shown in FIG. 2. The intersection points P, which lie in a plane, have the coordinates $(x_p, y_p)$ with x representing the horizontal and y the vertical axis. Six triangles, which jointly form a facet having a regular hexagonal edge contour, border each point P in FIG. 2.

Figure 3A:
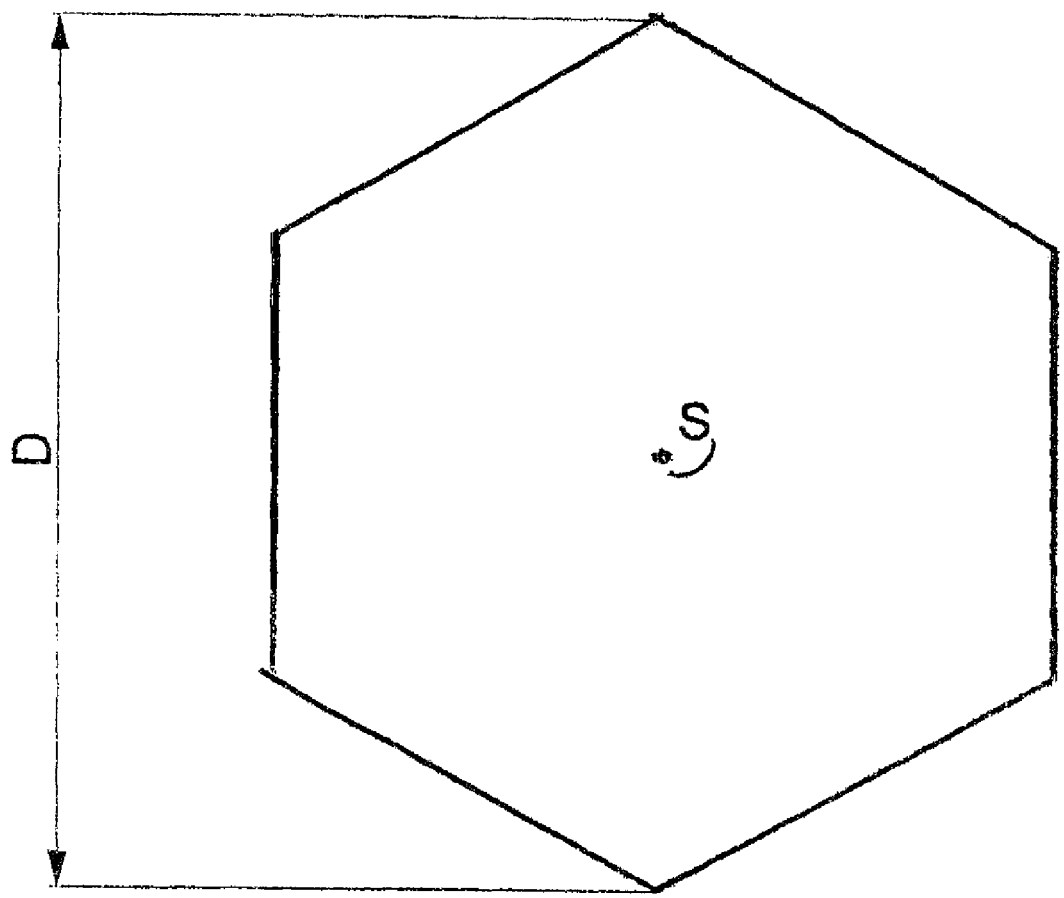
FIG. 3*a* is a diagrammatic view of one facet from the arrangement of FIG. 2, showing diagonal D.
Figure 3B:
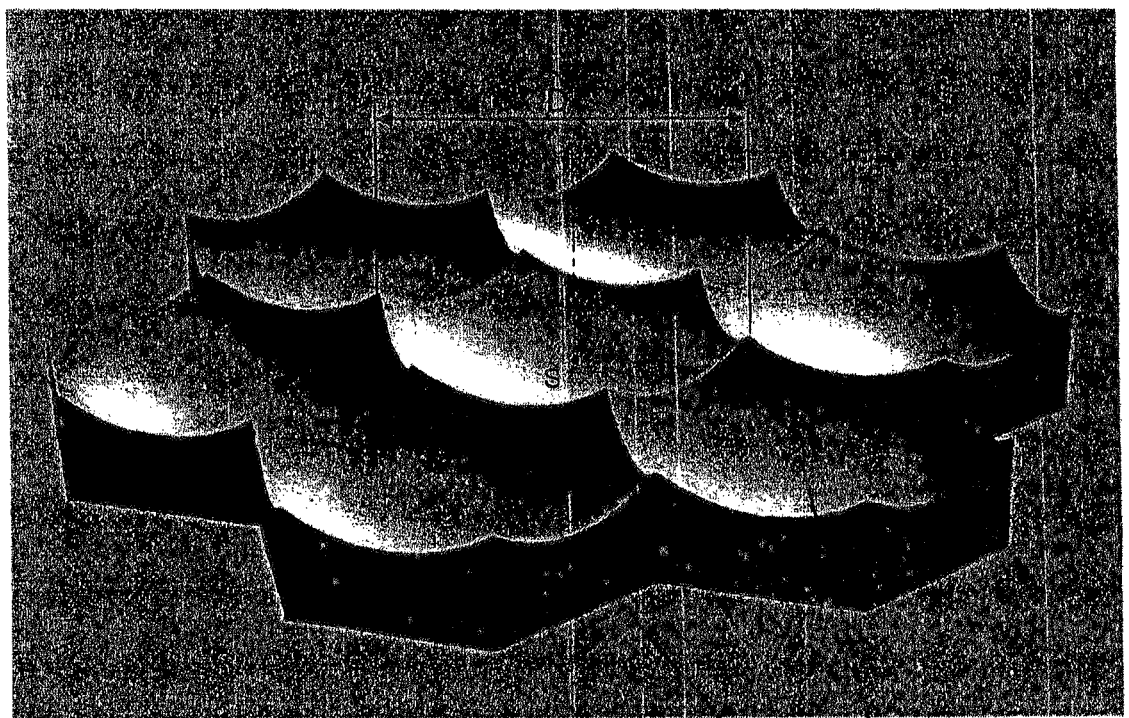
FIG. 3*b* is a cutaway perspective view of a portion of the facet arrangement of FIG. 2, with facets formed as concave cavities or depressions with apexes S.

FIG. 3a shows one facet of this type with diagonal D. FIG. 3b shows a cutaway view of a portion of an optical diffuser according to the invention with concave cavities with apexes S. Each depression or cavity has a hexagonal edge contour.

When the location of this sort of intersection point P is specified with Cartesian coordinates $(x_p, y_p)$ or with Polar coordinates $(r, \phi)$, a rotation can occur so that the following transformation is performed according to equations (4a, 4b, . . . , 4i):

$$r = \sqrt{x_p^2 + y_p^2} \tag{4a}$$

$$\varphi = \arctan\left\{\frac{y_p}{x_p}\right\} \tag{4b}$$

-continued $$N = r/[D \cdot \cos 30°] \tag{4c}$$

$$x' = \{D \cdot \cos 30°/2\}(1 + [\sin((2N-1)\delta)/\sin\delta]) \tag{4d}$$

$$y' = \{D \cdot \cos 30°/2\}(\tan^{-1}\theta - [\cos((2N-1)\delta)/\sin\delta]) \tag{4e}$$

$$R' = \sqrt{x'^2 + y'^2} \tag{4f}$$

$$\varphi' \arctan\left\{\frac{y'}{x'}\right\} \tag{4g}$$

$$x_p' = R' \cdot \cos(\varphi + \varphi') \tag{4h}$$

$$y_p' = R' \cdot \sin(\varphi + \varphi') \tag{4i}$$

These new equations may be designated as equation system 2, wherein N, x', y', R' and φ' represent computed intermediate variables.

The initial coordinates $(x_p, y_p)$ are thus transformed into final coordinates $(x_p', y_p')$. The mathematical result can be interpreted physically as if an optical diffuser made from elastic material is twisted about the angle δ. The result is as shown in FIG. 4, in which the solid lines SL drawn from the center point 0,0 through the points P illustrate the twisting. For the limiting case δ=0° a facet arrangement with a regular hexagonal edge contour is again present as in FIG. 2. The twisting causes a smaller change of the initial coordinates in the inner region of the optical diffuser near the center, and a larger change in the exterior region comparatively far from the center 0,0. It should be emphasized that the "twisting" is only a pictorialization of the mathematical transformation and is not to be taken literally.

During transformation of the initial coordinates $(x_p, y_p)$ into final coordinates $(x_p', y_p')$ each point P experiences a shift of about a certain arc length L. This arc length increases with the distance of the point P from the center (0, 0). It can linearly increase as shown in FIG. 4, or the increase can occur with a root or exponential function.

All points $(x_p', y_p')$ are found in a plane in the above-described embodiment. This presupposes a base body with a planar surface. However in so far as it is desirable the base body can also have a curved, e.g. a concave, surface. In this latter case all points $(x_p', y_p')$ must still be found on the curved surface.

The x- and y-coordinates of a point P and the associated apexes S are identical, i.e. $x_s'=x_p'$, $y_s'=y_p'$. S and P differ in regard to their z-coordinates, wherein the z-axis is perpendicular to the drawing plane of FIG. 2. The difference in the z-coordinate represents the height of the elevation or the depth of the depression 4. In the simplest case the z-coordinate differs by a fixed value, so that $z_s'=z_p'+$const. Generally, as described above, the height of the elevation or the depth of the depression and also $|z_s'-z_p'|$ are variable.

The effect, which a predetermined transformation or twist angle δ has on the resulting facet form, is dependent on the ratio of the optical diffuser diameter to the facet diagonal D. If the twist angle is too large, the result is thus a nearly smooth surface at the optical diffuser edge and thus vanishing or slight light scattering in this region. A smaller angle δ leads to a smaller smooth surface in the outer region and to improved scattering at the edge. On the other hand a reduction of δ naturally leads to an only slightly smaller change of the regular arrangement of the facets and thus increasingly to the above-described disadvantages of a regular facet arrangement.

In an advantageous embodiment of the invention the twist angle δ for the transformation is not constant, but increases with increasing distance from the center. In so far as a too great twist angle δ can be avoided in the optical diffuser edge region, the scattering action in the interior region of the diffuser can be sufficient.

Figure 5:
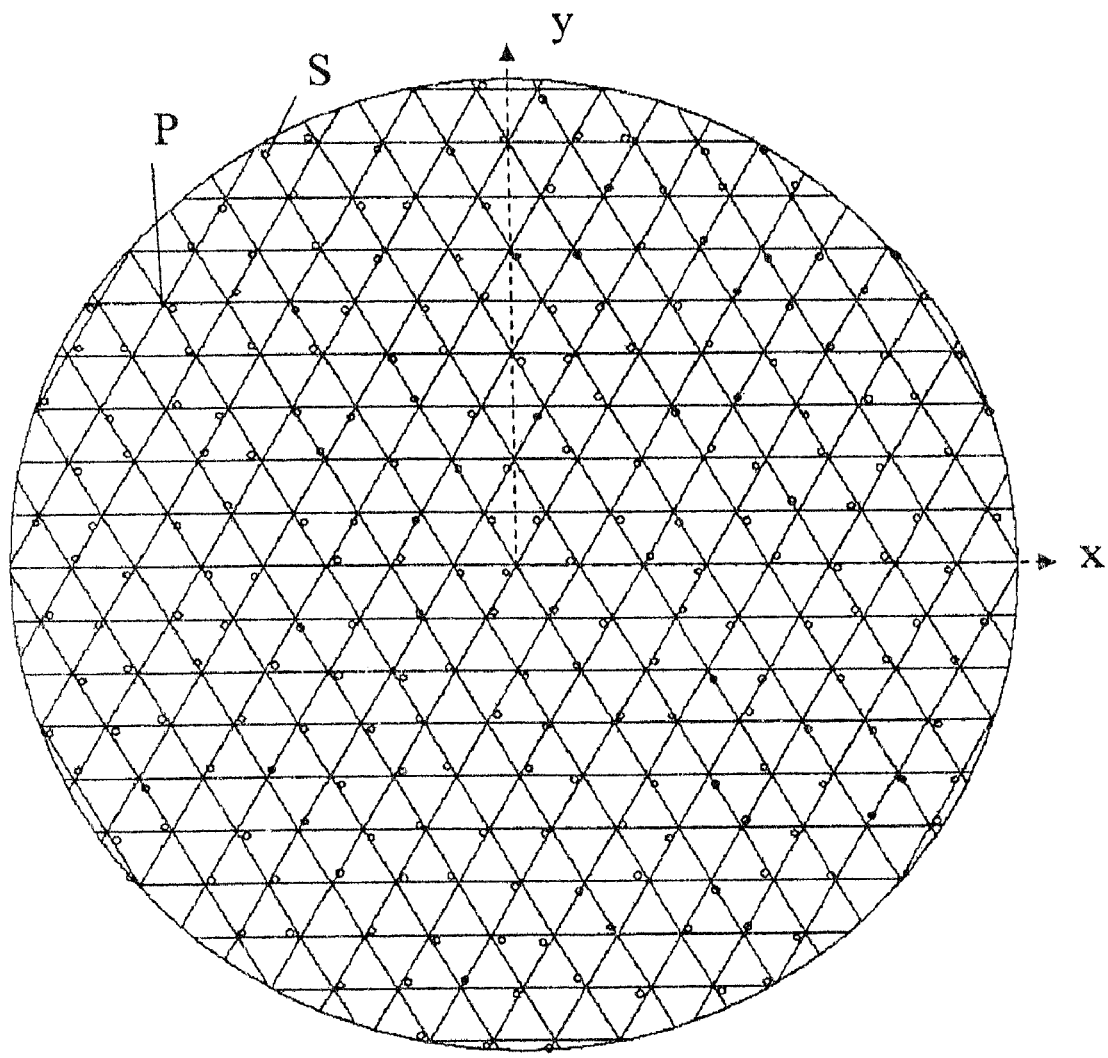
FIG. 5 is a diagrammatic view of a facet arrangement according to a third embodiment of the invention.

In a third embodiment of the optical diffuser shown in FIG. 5 a light scattering disk, or optical diffuser, is provided, which has a transparent base body with a first surface divided into facets. Each facet is associated with an elevation or depression with a second curved surface. The apexes S of the elevations or depressions are characterized by coordinates ($x_s''$, $y_s''$) resulting from random variation of the coordinates ($x_p$, $y_p$) of all points P, which form a regular arrangement of facets with regular hexagonal edge contours, with the help of a Monte Carlo process.

The random number Z used for this purpose varies in a range from $0 \leq z < 1$ in accordance with equation 5a and 5b, wherein $$x_s'' = x_p + (0.5 - Z) * U \quad (5a)$$

$$y_s'' = y_p + (0.5 - Z) * V \quad (5b)$$

The points P ($x_p$, $y_p$, $z_p$) and S ($x_s''$, $y_s''$, $z_s''$) differ in the z-coordinate as in the second embodiment described above. The height of the elevation or the depth of the depression is represented by $|z_s'' - z_p'|$.

FIG. 5 shows the intersection points P of an arrangement of facets with regular hexagonal edge contours according to equation system 1 (equations 3a, 3b, 3c) with the coordinates ($x_p$, $y_p$), as shown in FIG. 2, together with the coordinates ($x_s''$, $y_s''$) about the points S obtained by means of the Monte Carlo process, which represent the apexes of the elevations or depressions.

Advantageously the parameters U and V are in a range from about 5% to about 20% of the facet diagonal, D. If the parameters U and V are selected so that they are greater, there is an increasing danger that the base body has gaps between the facets.

From the previous explanation one skilled in the art is given the parameters necessary to form and adjust the light field considering the lighting system employed. In so far as the selected starting point allows, the different geometric forms for the facets permit very many and variable adjustments of the light field to the respective conditions. There are also many possibilities to realize the desired light field, which differ in their design. An optical diffuser is provided by the present invention, which has an appearance that is optimized with regard to aesthetic considerations.

Several exemplary embodiments are provided, which illustrate the present invention in greater detail.

Figure 6:
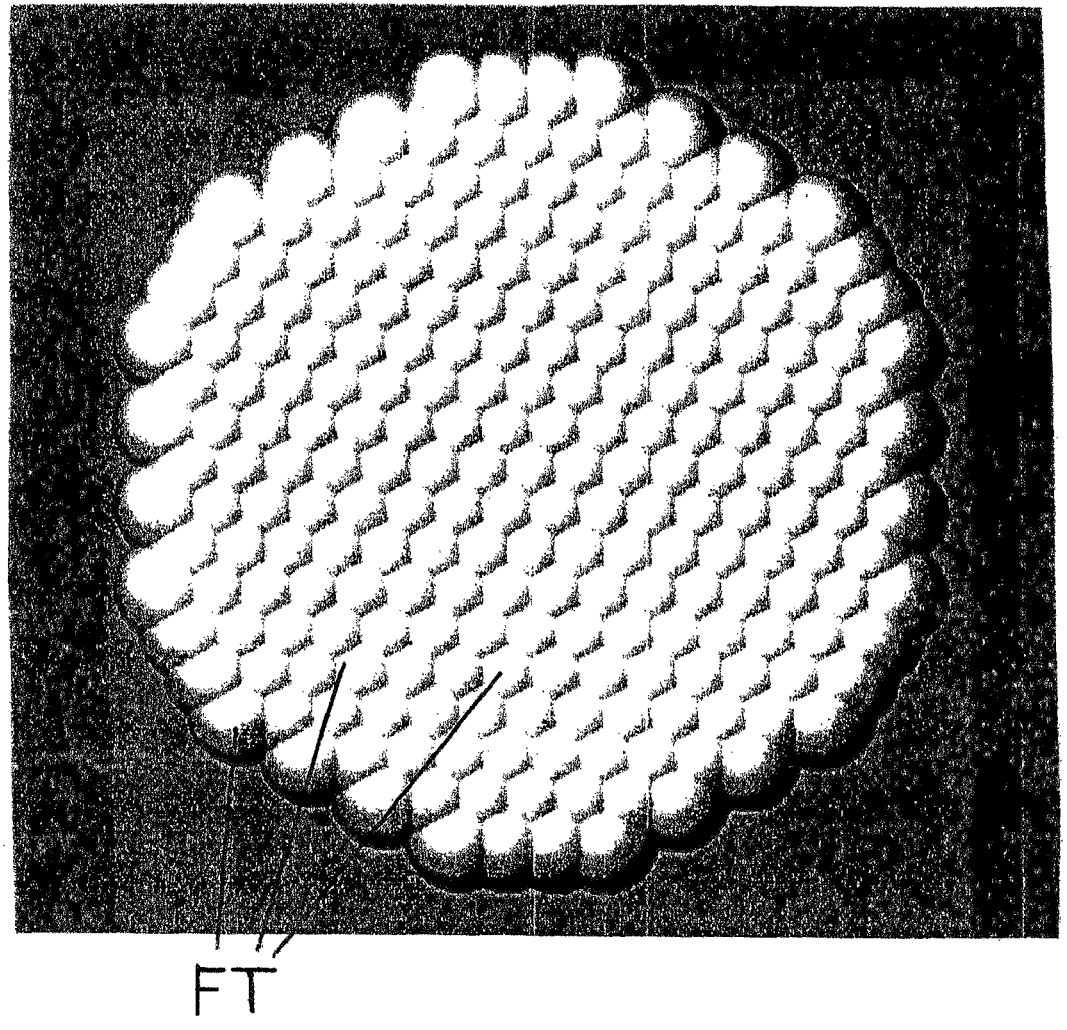
FIG. 6 is a plan view of an optical diffuser of the prior art with a regular facet arrangement including facets having a regular hexagonal edge contour similar to those described in EP 0 961 136 A1.

FIG. 6 shows an optical diffuser of the prior art with a facet arrangement similar to that shown in EP 0 961 136 A1. The optical diffuser has a diameter of 138 mm and is covered with facets FT with a regular hexagonal edge contour over its entire surface. Each hexagon has a diagonal D of 10 mm. The equation system 1 with $i_A = 9$ and $i_E = 9$ was used for modeling. Each elevation is spherically curved with a curvature radius of 10 mm.

Figure 7:
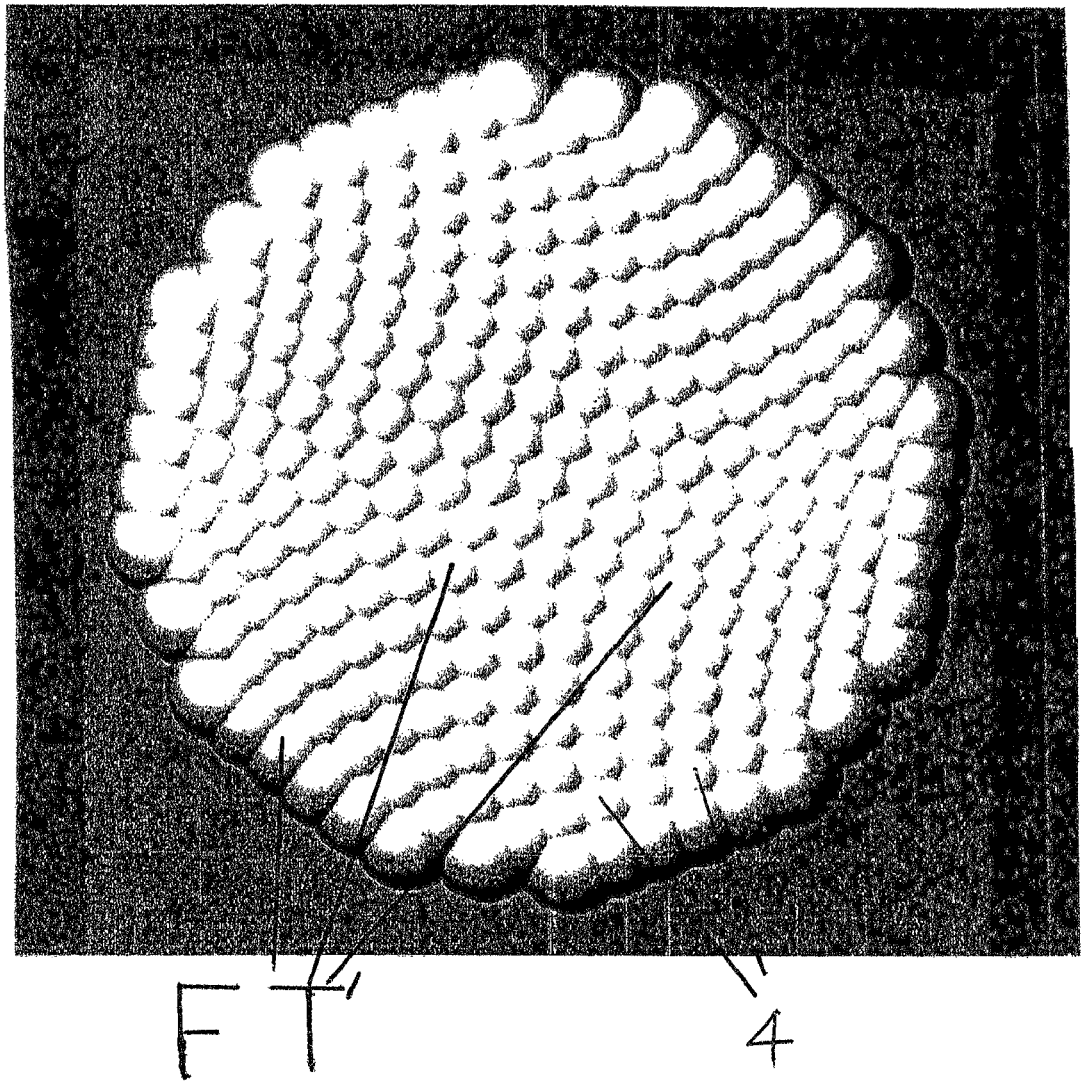
FIG. 7 is a plan view of one embodiment of an optical diffuser according to the invention.

FIG. 7 shows an embodiment, in which the regular arrangement according to FIG. 6 is twisted into another embodiment with the help of equation system 2 about a twist angle $\delta = 3°$. In FIG. 7 one sees that the facets FT' are now arranged irregularly. The facets no longer have the same shape, but have different areas and a different number of corners. Also the orientation of the facets differs.

Figure 8:
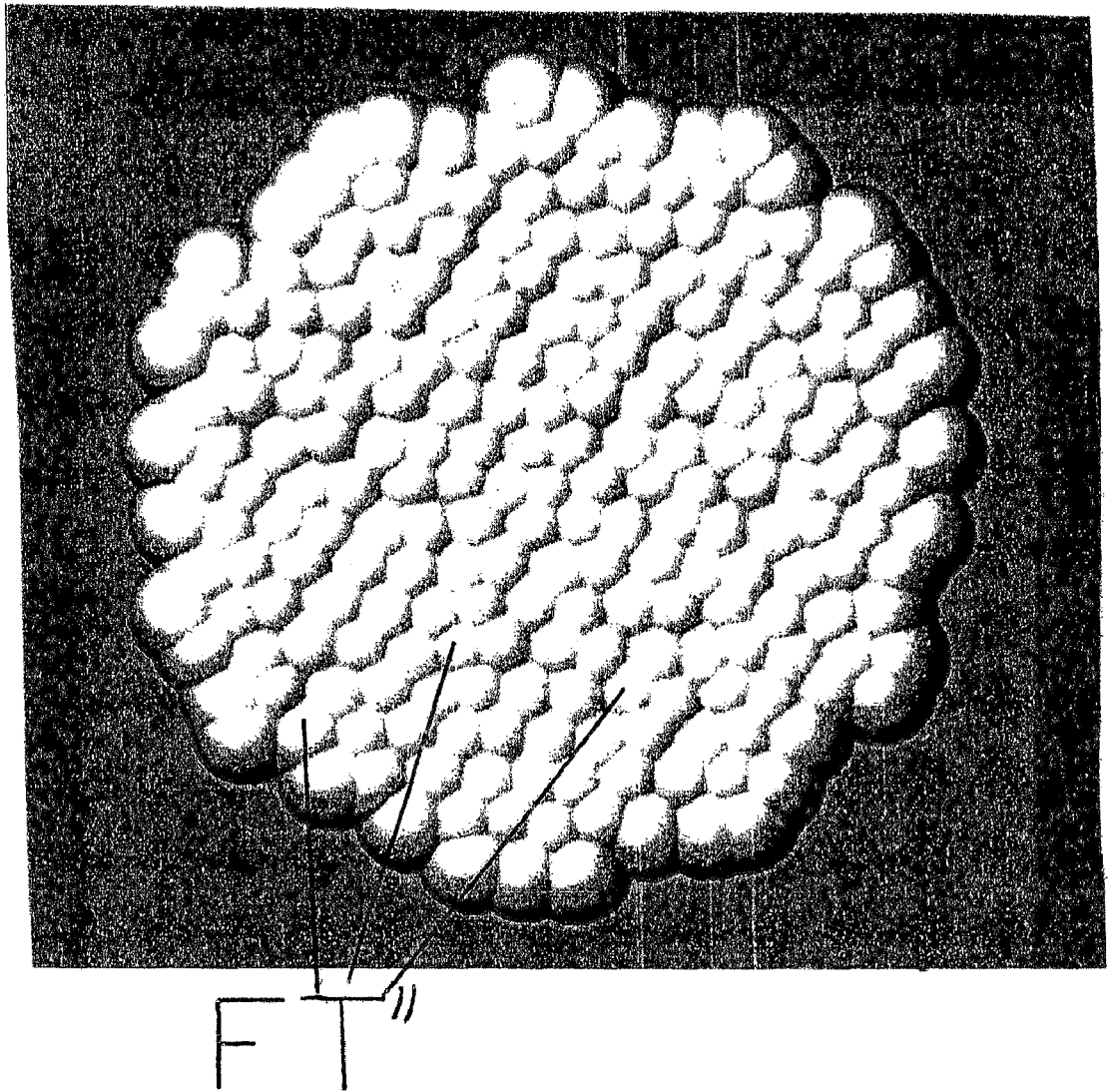
FIG. 8 is a plan view of another embodiment of an optical diffuser according to the invention.

FIG. 8 shows an embodiment, in which the coordinates of the regular facet arrangement according to FIG. 6 were randomly varied by a Monte Carlo method. In this case $U = 0.2*D$ and $V = 0.2*D$. Thus U and V are both equal to 2 mm with $D = 10$ mm. Also the facets FT'' have different contours and orientations here, and appear visibly different from the arrangement according to FIG. 6.

Figure 9:
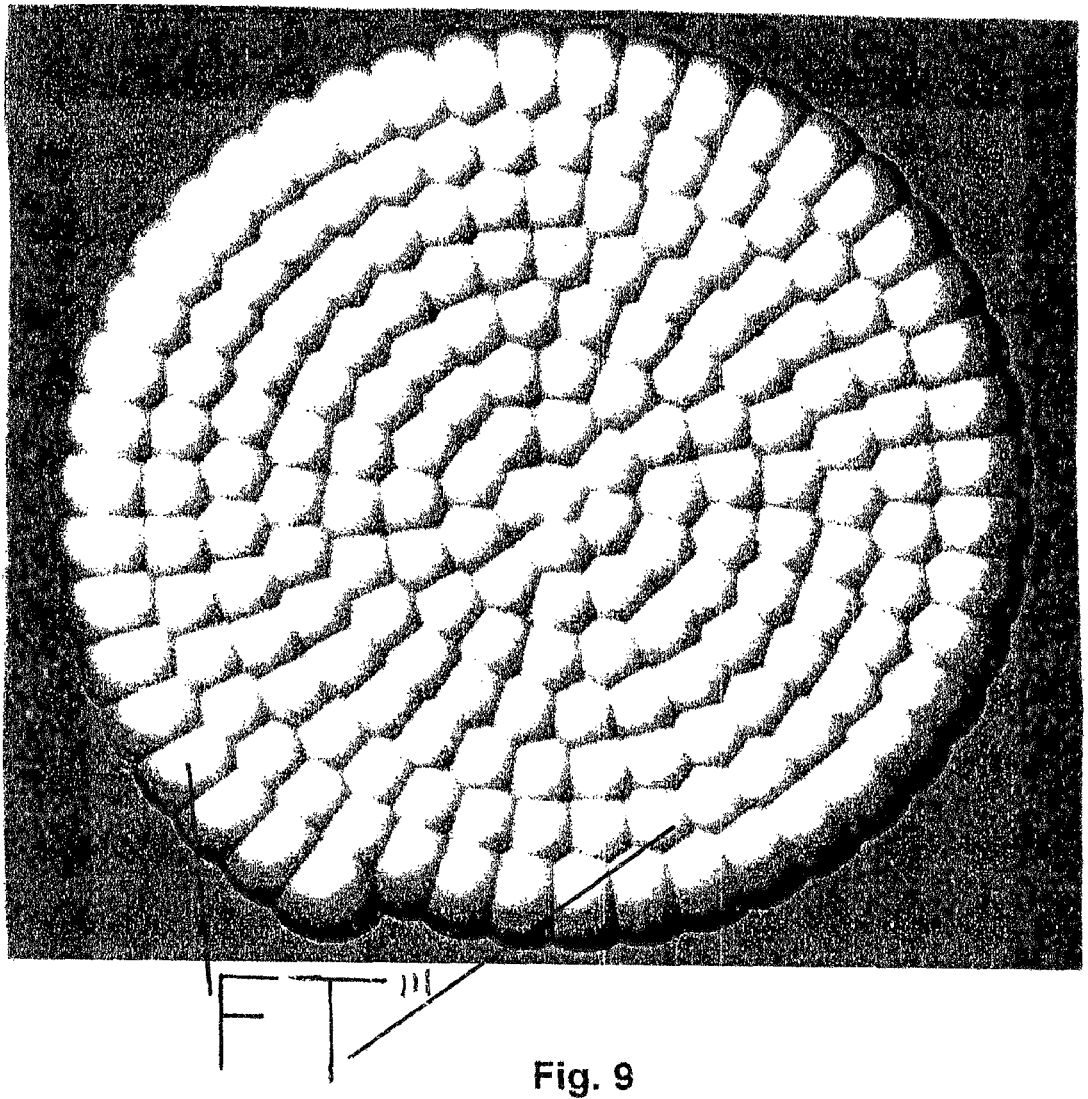
FIG. 9 is a plan view of an additional embodiment of an optical diffuser according to the invention, with the apexes of the facets arranged along an Archimedean spiral.

FIG. 9 shows an optical diffuser with a diameter of 138 mm, in which the facets FT''' are arranged with their apexes S in an Archimedean spiral. The initial facets were regular hexagonal shaped as in FIG. 6, however with a diagonal D of 12 mm. The spiral spacing d is 9 mm and the arc length L is similarly 9 mm. Each spherical elevation has a curvature radius of 10 mm.

Figure 10:
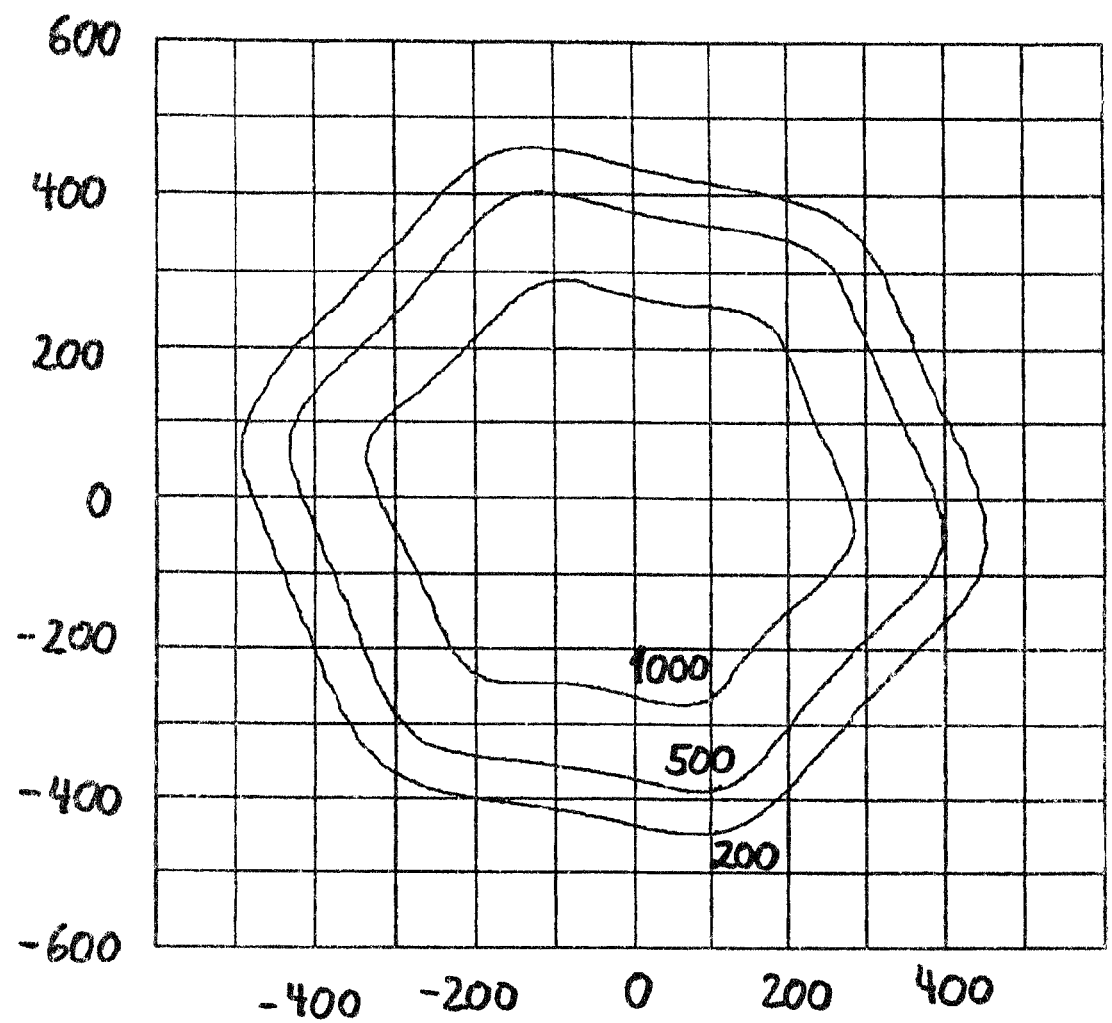
FIG. 10 is a graphical illustration showing an isolux distribution for the optical diffuser according to the prior art as described in EP 0 961 136 A1.

FIG. 10 shows a so-called isolux distribution in the xy-plane of the light field with x as the horizontal axis and y as the vertical axis. This isolux distribution is for the case of a light equipped with an optical diffuser, whose surface is formed with a regular facet arrangement according to equation system 1, as in the case of EP 0 0961 136 A2 (prior art). The isolux distribution has lines of constant illumination intensity at 1000 lux, 500 lux and 200 lux. The lines of constant illumination intensity take a hexagonal form, and the light field is entirely definitely hexagonal for this prior art optical diffuser.

Figure 11:
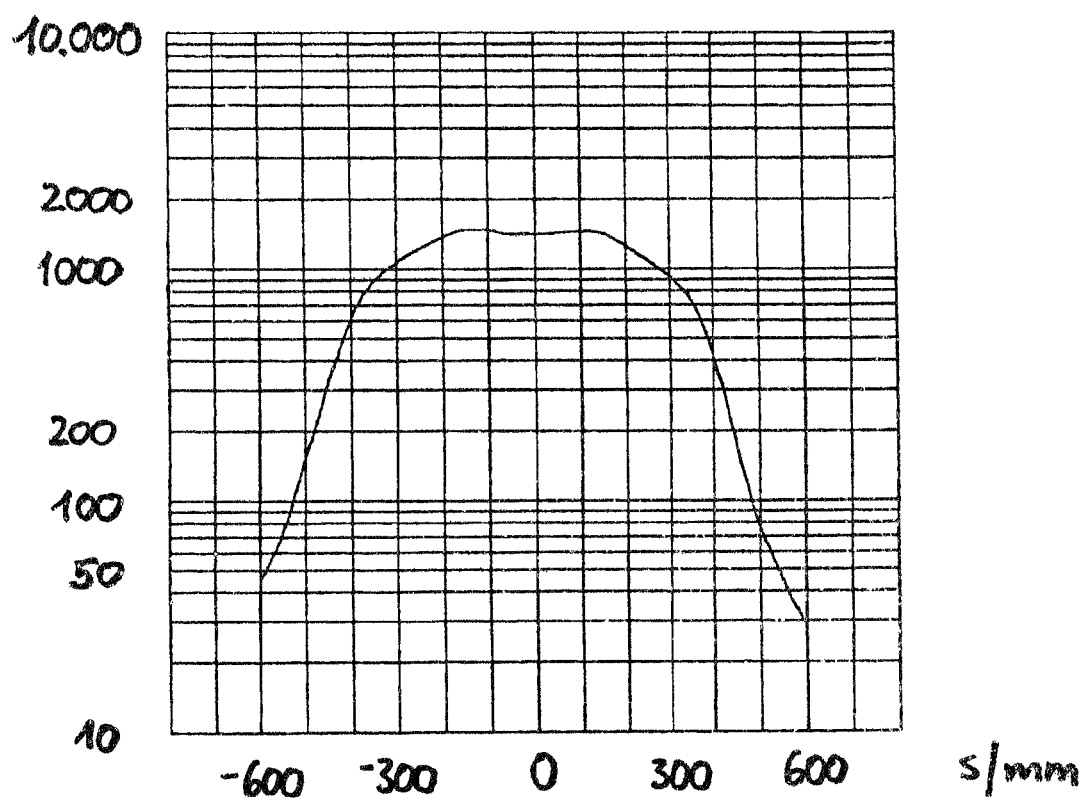
FIG. 11 is a graphical illustration showing a horizontal intensity distribution for the optical diffuser according to the prior art as described in EP 0 961 136 A1.

FIG. 11 shows a so-called horizontal illumination intensity distribution for the same light as in FIG. 10 (prior art). It shows the behavior of the illumination intensities along the horizontally aligned x-axis for an optical diffuser similar to that in EP 0 961 136 A2. The illumination intensities have a central plateau-shaped region and a sharp edge drop off at the edge of the hexagonal light field.

Figure 12:
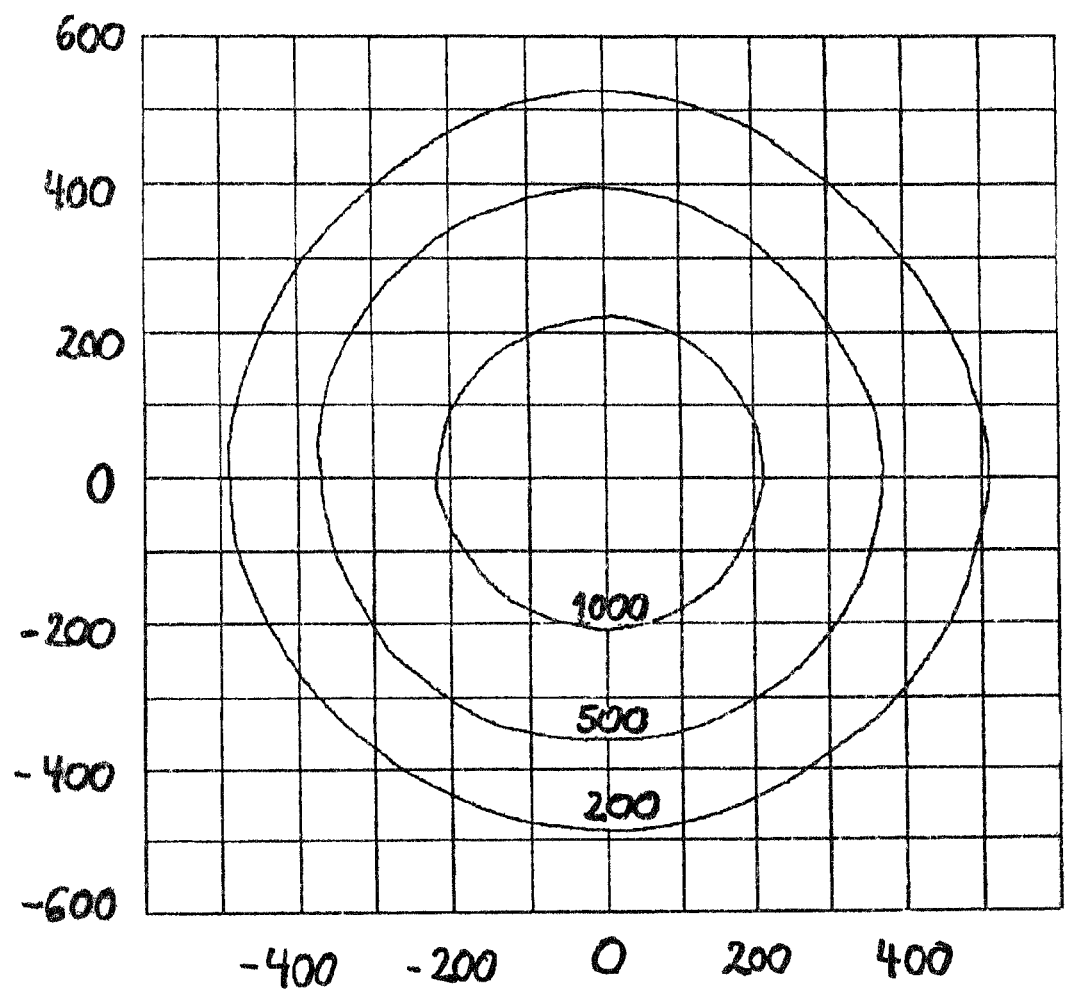
FIG. 12 is a graphical illustration showing an isolux distribution for an optical diffuser according to the invention, which produces a circular light field.

FIG. 12 shows the isolux distribution for the light field of the same light as in FIG. 10, except that the light has an optical diffuser according to the invention. The lines of constant illumination strength are now circular and the light field is similarly circular in its entirety.

Figure 13:
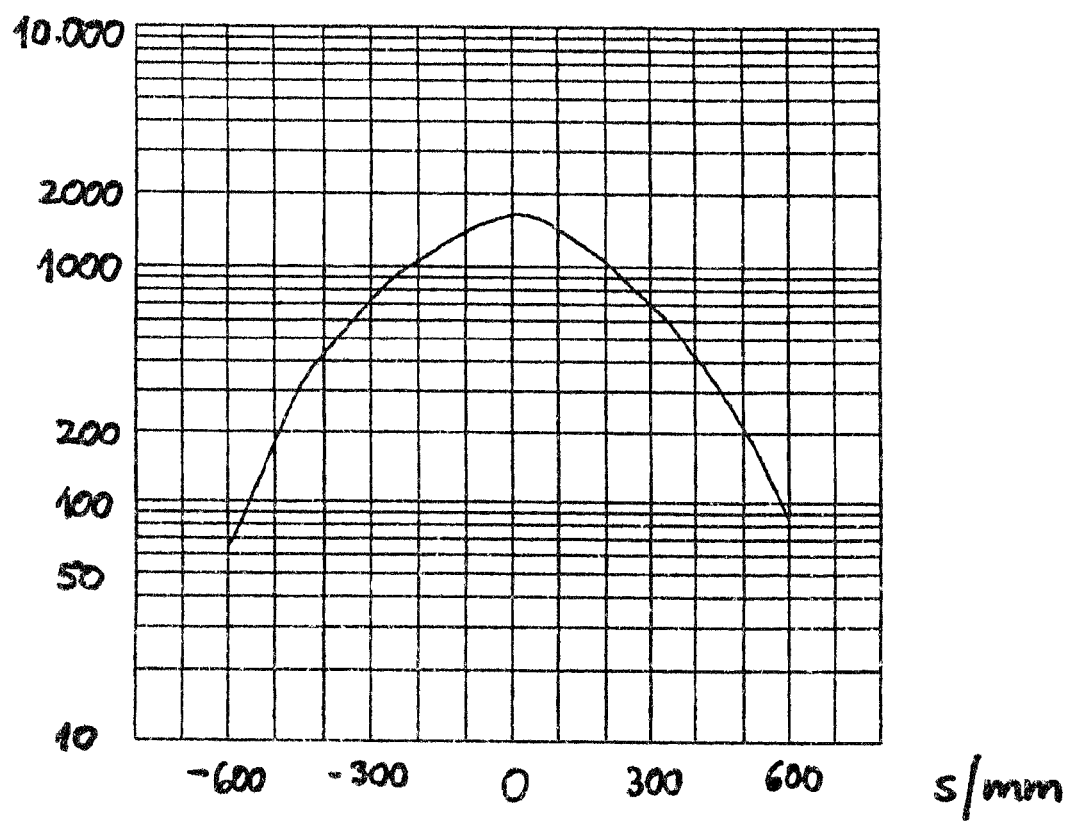
FIG. 13 is a graphical illustration showing a horizontal intensity distribution for the optical diffuser according to the invention of FIG. 12, which produces a soft light field.

FIG. 13 shows the corresponding results of the horizontal illumination intensity similar to FIG. 11, when the light is equipped with the optical diffuser according to the invention. The behavior of the horizontal illumination intensities is bell-shaped. The increase occurs slowly so that the light field is soft.

The disclosure in German Patent Application 103 43 630.8-54 of Sep. 20, 2003 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in an optical diffuser for producing a circular light field, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. An optical diffuser comprising a transparent base body with a base body surface, wherein said base body surface comprises a plurality of facets, said facets have elevations or depressions associated therewith, and said elevations or said depressions have respective apexes (S), wherein coordinates $(x_s', y_s')$ of said respective apexes (S) are derived from coordinates $(x_p, y_p)$ of corresponding points (P), said points (P) being defined by an arrangement of regular hexagonal facets with regular hexagonal edge contours;

wherein said coordinates $(x_s', y_s')$ are derived from said coordinates $(x_p, y_p)$ of said points (P) by a rotation of said arrangement of said regular hexagonal facets with said regular hexagonal edge contour about a center (0, 0) through a twist angle ($\delta$).

2. The optical diffuser as defined in claim 1, wherein said twist angle ($\delta$) increases with increasing distance from said center (0, 0).

3. The optical diffuser as defined in claim 2, wherein at least two of said elevations have respective different heights or at least two of said depressions have respective different depths.

4. The optical diffuser as defined in claim 1, wherein said points (P) of said regular hexagonal facets are points of intersection of lines of three systems of parallel lines, wherein said lines of one of said systems of said parallel lines are horizontal and each of said systems of said parallel lines is rotated by 60° in relation to a neighboring system thereof.

5. An optical diffuser comprising a transparent base body with a base body surface, wherein said base body surface comprises a plurality of facets, said facets have elevations or depressions associated therewith, and said elevations or said depressions have respective apexes (S), wherein coordinates $(x_s', y_s')$ of said respective apexes (S) are derived from coordinates $(x_p, y_p)$ of corresponding points (P), said points (P) being defined by an arrangement of regular hexagonal facets with regular hexagonal edge contours;

wherein said coordinates $(x_s', y_s')$ are derived from said coordinates $(x_p, y_p)$ of said points (P) by a rotation of said arrangement of said regular hexagonal facets with said regular hexagonal edge contour about a center (0, 0) through a twist angle ($\delta$); and wherein said twist angle ($\delta$) increases linearly with increasing distance from said center (0,0), as a root of said increasing distance from said center (0,0) or exponentially with said increasing distance from said center (0, 0).

\* \* \* \* \*

UNITED STATES PATENT AND TRADEMARK OFFICE
CERTIFICATE OF CORRECTION

| | | |
|---|---|---|
| PATENT NO. | : 7,729,054 B2 | Page 1 of 1 |
| APPLICATION NO. | : 12/233851 | |
| DATED | : June 1, 2010 | |
| INVENTOR(S) | : Becker et al. | |

It is certified that error appears in the above-identified patent and that said Letters Patent is hereby corrected as shown below:

Title Page, Item (73) Delete "Schott AG, Mainz (DE)" and insert --Auer Lighting GMBH, Bad Gandersheim (DE)--

Signed and Sealed this
Second Day of October, 2012

David J. Kappos
*Director of the United States Patent and Trademark Office*